(12) United States Patent
Baugher

(10) Patent No.: US 7,533,258 B2
(45) Date of Patent: May 12, 2009

(54) USING A NETWORK-SERVICE CREDENTIAL FOR ACCESS CONTROL

(75) Inventor: Mark John Baugher, Portland, OR (US)

(73) Assignee: Cisco Technology, Inc., SAn Jose, CA (US)

( * ) Notice: Subject to any disclaimer, the term of this patent is extended or adjusted under 35 U.S.C. 154(b) by 132 days.

(21) Appl. No.: 11/032,764

(22) Filed: Jan. 7, 2005

(65) Prior Publication Data

US 2006/0156390 A1    Jul. 13, 2006

(51) Int. Cl.
*H04L 9/00* (2006.01)
*G04F 7/04* (2006.01)
*G06F 7/04* (2006.01)

(52) U.S. Cl. ............................. 713/156; 726/2; 726/26; 713/162

(58) Field of Classification Search ................. 713/156, 713/162; 715/156; 726/2, 26
See application file for complete search history.

(56) References Cited

U.S. PATENT DOCUMENTS

| | | | |
|---|---|---|---|
| 5,550,981 A * | 8/1996 | Bauer et al. ................... | 790/220 |
| 6,065,120 A * | 5/2000 | Laursen et al. .................. | 726/5 |
| 6,438,550 B1 | 8/2002 | Doyle et al. | |
| 6,452,925 B1 | 9/2002 | Sistanizadeh et al. | |
| 6,618,858 B1 * | 9/2003 | Gautier ........................ | 725/132 |
| 6,675,208 B1 | 1/2004 | Rai et al. | |
| 6,826,699 B1 | 11/2004 | Sun | |
| 6,856,591 B1 * | 2/2005 | Ma et al. ..................... | 370/216 |
| 6,879,566 B1 * | 4/2005 | Raivio et al. ............. | 370/310.1 |
| 6,988,210 B1 | 1/2006 | Audebert | |
| 6,993,580 B2 | 1/2006 | Isherwood et al. | |
| 7,032,242 B1 * | 4/2006 | Grabelsky et al. ............. | 726/11 |
| 7,076,653 B1 * | 7/2006 | Remer et al. ................. | 713/155 |
| 7,076,655 B2 * | 7/2006 | Griffin et al. ................ | 713/164 |
| 7,103,574 B1 | 9/2006 | Peinado et al. | |
| 7,103,769 B1 * | 9/2006 | Fleming et al. ............. | 713/151 |
| 7,114,070 B1 * | 9/2006 | Willming et al. ............ | 713/156 |
| 7,143,287 B2 * | 11/2006 | Bade et al. .................. | 713/164 |
| 7,149,722 B1 | 12/2006 | Abburi | |
| 7,181,620 B1 * | 2/2007 | Hur ............................. | 713/171 |
| 7,224,805 B2 | 5/2007 | Hurst et al. | |

(Continued)

FOREIGN PATENT DOCUMENTS

WO    WO 2004025926 A1 *    3/2004

OTHER PUBLICATIONS www.w3.org, "Protected W3C httpd Setup," 5 pages total, Jul. 1995, W3, www.w3.org/daemon/user/config/accessauth.html.

(Continued)

*Primary Examiner*—Emmanuel L Moise
*Assistant Examiner*—Techane J Gergiso
(74) *Attorney, Agent, or Firm*—Stolowitz Ford Cowger LLP

(57) ABSTRACT

Methods and devices for controlling access to a service over a network are described. A credential is provided to a device. The credential indicates the device is enrolled in the network. The credential is stored in non-volatile memory on the device. The credential binds the device to the network and prevents the device from accessing another network. The device presents the credential to a provider, and the provider uses the credential to authenticate and authorize the device. Upon authorization, the device is provided access to the service.

15 Claims, 3 Drawing Sheets

U.S. PATENT DOCUMENTS

| | | | |
|---|---|---|---|
| 7,249,374 B1 * | 7/2007 | Lear et al. .................... 726/6 |
| 7,287,282 B2 * | 10/2007 | Yamada et al. ............... 726/26 |
| 7,322,043 B2 * | 1/2008 | Letsinger .................... 726/19 |
| 7,352,731 B1 * | 4/2008 | Leung ....................... 370/338 |
| 7,424,613 B2 * | 9/2008 | Han et al. ................... 713/168 |
| 7,447,183 B1 * | 11/2008 | Leung ....................... 370/338 |
| 2002/0025042 A1 | 2/2002 | Saito |
| 2002/0112186 A1 | 8/2002 | Ford et al. |
| 2002/0114462 A1 * | 8/2002 | Kudo et al. ................. 380/203 |
| 2002/0116647 A1 * | 8/2002 | Mont et al. ................. 713/201 |
| 2003/0005285 A1 | 1/2003 | Graunke |
| 2003/0023564 A1 | 1/2003 | Padhye et al. |
| 2003/0110378 A1 | 6/2003 | Yamada et al. |
| 2003/0135730 A1 | 7/2003 | Szucs et al. |
| 2003/0145214 A1 | 7/2003 | Saito et al. |
| 2003/0185233 A1 * | 10/2003 | Ji et al. ....................... 370/466 |
| 2003/0198351 A1 | 10/2003 | Foster et al. |
| 2003/0216143 A1 | 11/2003 | Roese et al. |
| 2003/0226011 A1 | 12/2003 | Kuwano et al. |
| 2003/0226012 A1 * | 12/2003 | Asokan et al. .............. 713/156 |
| 2003/0229792 A1 | 12/2003 | Baldwin et al. |
| 2003/0236991 A1 * | 12/2003 | Letsinger .................... 713/200 |
| 2004/0022253 A1 * | 2/2004 | Foschiano et al. ...... 370/395.54 |
| 2004/0022390 A1 * | 2/2004 | McDonald et al. .......... 380/277 |
| 2004/0032950 A1 | 2/2004 | Graunke |
| 2004/0042413 A1 * | 3/2004 | Kawamura et al. .......... 370/252 |
| 2004/0053622 A1 | 3/2004 | Nakakita et al. |
| 2004/0123152 A1 | 6/2004 | Le Saint |
| 2004/0131357 A1 | 7/2004 | Farmer et al. |
| 2004/0133780 A1 * | 7/2004 | Saito et al. .................. 713/168 |
| 2004/0151179 A1 | 8/2004 | Andre et al. |
| 2004/0161108 A1 | 8/2004 | Ando et al. |
| 2004/0168062 A1 * | 8/2004 | Isozaki et al. ............... 713/171 |
| 2004/0168081 A1 * | 8/2004 | Ladas et al. ................. 713/201 |
| 2004/0213260 A1 * | 10/2004 | Leung et al. ............. 370/395.3 |
| 2004/0225806 A1 * | 11/2004 | Emura et al. ................ 710/305 |
| 2005/0004875 A1 | 1/2005 | Kontio et al. |
| 2005/0027871 A1 * | 2/2005 | Bradley et al. .............. 709/227 |
| 2005/0039037 A1 | 2/2005 | Sakoh |
| 2005/0063333 A1 | 3/2005 | Patron et al. |
| 2005/0074121 A1 | 4/2005 | Miura |
| 2005/0075986 A1 | 4/2005 | You et al. |
| 2005/0086514 A1 | 4/2005 | Han et al. |
| 2005/0086532 A1 * | 4/2005 | Lotspiech et al. ........... 713/201 |
| 2005/0125357 A1 | 6/2005 | Saadat et al. |
| 2005/0169473 A1 | 8/2005 | Candelore |
| 2005/0182931 A1 * | 8/2005 | Robert et al. ............... 713/168 |
| 2005/0192902 A1 | 9/2005 | Williams |
| 2005/0209972 A1 | 9/2005 | Bjorkengren et el. |
| 2005/0210261 A1 | 9/2005 | Kamperman et al. |
| 2005/0228874 A1 * | 10/2005 | Edgett et al. ................ 709/220 |
| 2005/0229004 A1 | 10/2005 | Callaghan |
| 2005/0234735 A1 | 10/2005 | Williams |
| 2005/0246529 A1 | 11/2005 | Hunt et al. |
| 2006/0005254 A1 * | 1/2006 | Ross ............................ 726/27 |
| 2006/0010442 A1 * | 1/2006 | Desai et al. ................. 718/100 |
| 2006/0059573 A1 * | 3/2006 | Jung et al. ................... 726/31 |
| 2006/0112015 A1 | 5/2006 | Chancellor et al. |
| 2006/0150238 A1 * | 7/2006 | D'Agostino .................. 726/1 |
| 2006/0198519 A9 | 9/2006 | Candelore |
| 2007/0027814 A1 * | 2/2007 | Tuoriniemi .................. 705/59 |
| 2007/0162981 A1 | 7/2007 | Morioka et al. |

OTHER PUBLICATIONS

International Searching Authority, International Search Report and Written Opinion, Jan. 26, 2007, pp. 2-13, ISA/US Alexandria, Virginia USA.

www.dtcp.com, "5C Digital Transmission Content Protection White Paper," 15 pages total, Jul. 14, 1998, Hitachi, Ltd., Intel Corporation, Matsuhita Electric Industrial, Co., Ltd., Sony Corporation, Toshiba Corporation; www.dtcp.com/data/wp_spec.pdf.

en.wikipedia.org, "Time to live", 2 pages total, Mar. 22, 2008, http://en.wikipedia.org/wiki/Time_to_live.

* cited by examiner

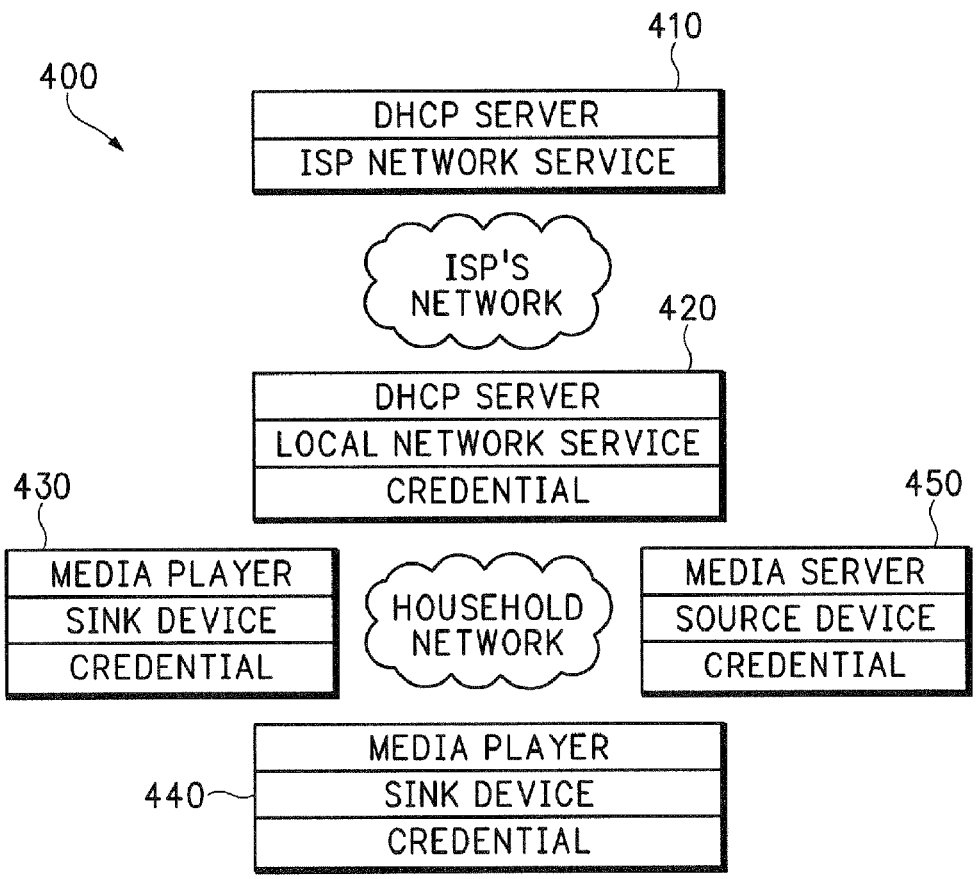

USING A NETWORK-SERVICE CREDENTIAL FOR ACCESS CONTROL

TECHNICAL FIELD

Embodiments of the present invention pertain to access control. Specifically, embodiments of the present invention pertain to the use of a signed credential to enable and control access.

BACKGROUND ART

Laws, customs, and business agreements typically regulate the dissemination of data. Access to network data such as files, records, and streams often must be kept within an enterprise network or consumer (household) network. Such restrictions are not automatically controlled on Internet Protocol (IP) networks in the current art. A device on an IP network can send data to remote networks. An IP tunnel, for instance, can give an IP address for a local network to a remote device. Such tunnels can be transparent to the local network. Thus, a device is located on a network for which it has an address and not necessarily on the network to which it is physically attached. In general, a device may belong to multiple networks, serially or concurrently, anywhere on Earth or in Space.

One network data security scheme is the DTCP/IP (Digital Transmission Content Protection on Internet Protocol) standard, which attempts to restrict the physical distance between data source and destination (sink) devices. The source DTCP/IP device executes a ping command before transferring content to a sink device; if the ping exceeds a time threshold, DTCP/IP logic concludes that the sink device is remote to the household and refuses access, i.e., the DTCP/IP source refuses to give the content decryption keys to the sink when the ping takes too long. This scheme is not robust when there is great diversity in the networks and devices that interconnect them. Nor is it future-proof to improvements in network speeds. In addition, DTCP/IP devices on wireless networks will indiscriminately share data across households and violate household-based subscription models. This reality of IP networking poses a problem for business models and security policies that attempt to constrain the networks to which data can be copied, streamed, downloaded or otherwise transported.

Accordingly, an apparatus and/or method that can identify devices that are authorized for accessing data on a network regardless of tunneling, network-address translation, or multi-homing would be advantageous. The present invention provides a novel solution to this problem and related problems.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 3 is a logic table that can be used to determine the type of device (household, mobile, visitor, or foreign) that is attempting to gain access to data on a network according to an embodiment of the present invention.

FIG. 4 is a block diagram showing an embodiment of the household model with two sink devices and a source device on an administratively-scoped household network.

DETAILED DESCRIPTION OF THE INVENTION

Figure 1:
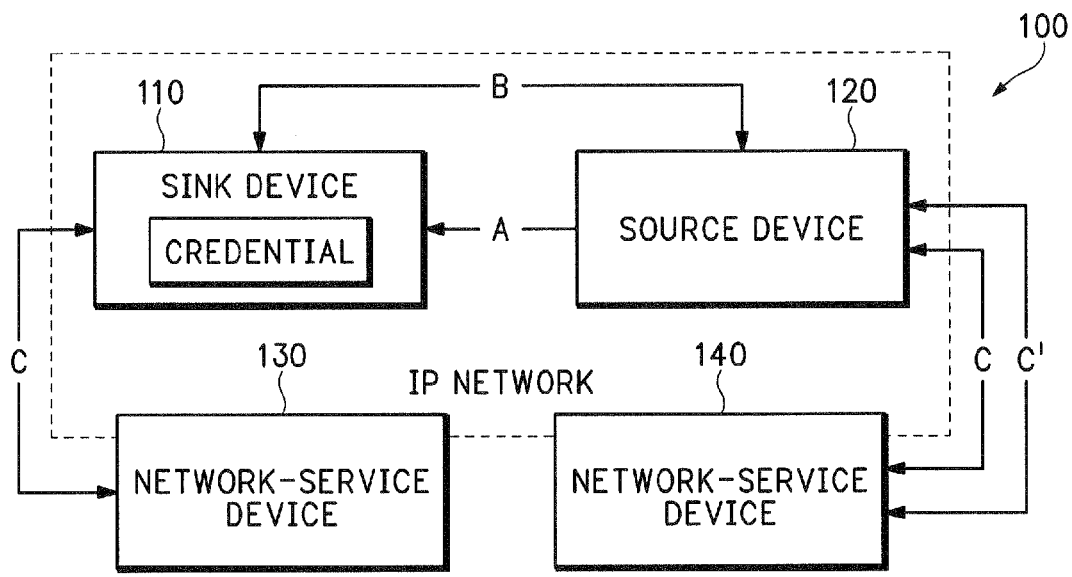
FIG. 1 is a block diagram of a network according to an embodiment of the present invention.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving" or "storing" or "presenting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In overview, embodiments in accordance with the present invention pertain to the use of a signed credential (or network-service credential) to enable and control data access on a network. In general, the present invention uses a logical association between a data-processing device and a network-service device, which issues a network-service credential when the particular source or sink device enrolls on its network.

According to embodiments of the present invention, a network-service credential is stored on a device and used to identify the network or service to which the device belongs. The device remains bound (via logical association using a network-service credential) to a particular network-service until another network-service permits re-enrollment, which is done according to the terms of a particular licensing authority or security policy. In an embodiment that uses the network-service credential, the device is permitted only one networkservice association at a time. Alternative embodiments may allow multiple network-service associations. If the device is illegitimately bound to one network-service, however, it can be prevented from legitimately binding to any other network-service when the policy is to restrict enrollment to one network service. Those wanting, for example, data-dissemination controls on home or enterprise networks can use embodiments of the present invention to control data transfer on, to, and from these networks.

In one embodiment, a credential is provided to a device. The credential enrolls the device in the network; more generally, the credential indicates that the device is enrolled in the network. The credential is stored in non-volatile memory on the device. The credential binds the device to the network and prevents the device from accessing another network when the policy is to restrict network enrollment to a single network service. The device presents the credential to a provider, and the provider uses the credential to authenticate and authorize the device. Following successful authorization, the device is provided access to the service to which it has previously enrolled. Essentially, a device is authenticated and authorized using its credentials, regardless of who may be using the device.

Embodiments of the present invention are useful for identifying devices that belong to a household or enterprise network regardless of tunneling, network-address translation, or multi-homing.

FIG. 1 is a block diagram of a network 100 according to an embodiment of the present invention. In one embodiment, network 100 is a representation of a household network with devices on the network. In another embodiment, network 100 is a representation of an enterprise network with devices on the network.

In the example of FIG. 1, the network 100 includes a sink device 110 upon which embodiments of the present invention can be implemented, a source device 120, a network-service device 130, and a network-service device 140. All devices are at least connected to a private network (e.g., a household or enterprise network), and may be connected to a public network as well (e.g., an Internet point of presence operated by an Internet service provider). The private network can include more elements than the example illustrated in the figures. Also, there can be additional source or sink devices located on the private network, and additional network-service devices, which may or may not straddle the public network (e.g., the device has one network interface on the private network and an interface on one or more public networks).

Continuing with FIG. 1, in one embodiment, the sink device 110 attempts to receive data from a source device 120 along arc A. Typically, the data is encrypted and the sink device 110 requests a decryption key from the source device 120 or some third device along arc B. Such key establishment algorithms, in which the requester presents a credential to the responder who uses it to authorize access, are well known. In FIG. 1, the requester is the sink device 110 and its authorizing credential is the network-service credential, which was previously obtained during the enrollment process by an arc C exchange. In the present embodiment, the sink device 110 secures the arc C exchange with IP Security (Ipsec) protocols using Digital Transmission License Authority (DTLA) credentials, which are initialized in sink device 110 memory (e.g., the credential for the device identity is in memory along with the root public key for the DTLA authority). Typically, the source device 120 and sink device 110 mutually authenticate using their respective keys and DTLA credentials. In one embodiment of the present invention, sink device 110 additionally passes its network-service credential to prove that it has enrolled on the particular network service, and source device 120 uses this credential for authorization purposes (e.g., to conditionally allow access to content works that are restricted to devices that are enrolled on a particular network).

The network-service device 130 and sink device 110 mutually authenticate using the DTLA credential when the sink device has no network-service credential but use both the DTLA and network service credential subsequent to the first network-service enrollment.

Alternative embodiments may use other authorities instead of or in addition to the DTLA, such as the Content Management License Administration (CMLA) of the Open Mobile Alliance.

In one embodiment, the arc C exchange occurs entirely within a household network between the sink device and the home-network device, which runs a Dynamic Host Configuration Protocol (DHCP) server of administratively scoped IP version 4 (IPv4) addresses. In another embodiment, the arc C exchange occurs between the home-network device and a service provider's equipment to obtain the service provider's network-service credential. In yet another embodiment, the arc C' exchange occurs in which a device can obtain or query additional credentials when the service is multi-homed. (A multi-homed device has more than one interface to the public network and appears as a set of devices, each with its own network-service credential).

With reference to FIG. 1, transactions on the arcs are confidential and integrity-protected. In one embodiment, source, sink, and network-service devices each have a secret, public/private keypair. It is known for a licensing authority to sign a credential that contains the device's public key and thereby attest to compliance with a device license or security policy. Digital Transmission Content Protection (DTCP), Content Protection for Recordable Media (CPRM) and High-bandwidth Digital Content Protection (HDCP) devices are examples of such devices. In the present invention, the network-service credential attests to device compliance with the network on which the device resides.

Figure 2:
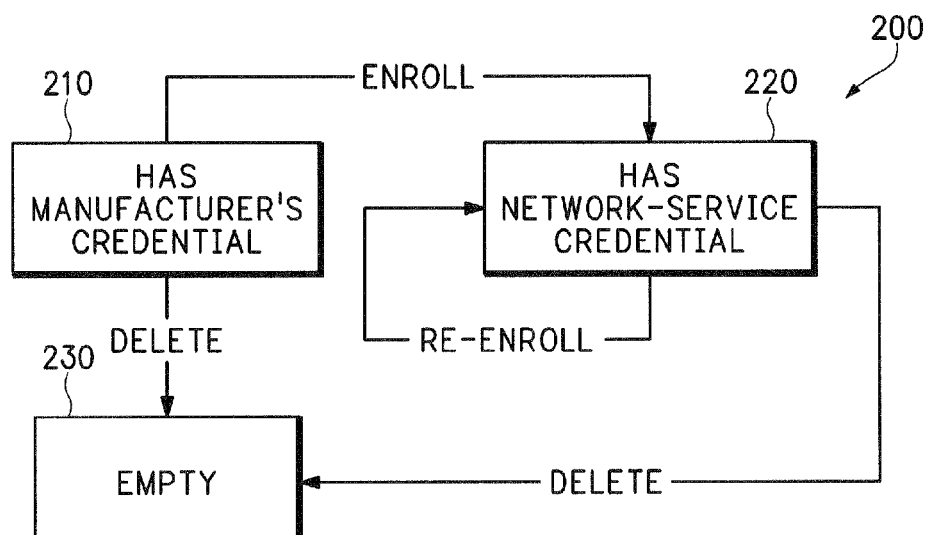
FIG. 2 is a state transition diagram for credentialing a device according to an embodiment of the present invention.

FIG. 2 is an apparatus state transition diagram 200 showing different enrollment states according to an embodiment of the present invention. This diagram defines how a network-service credential is initialized in non-volatile apparatus memory, maintained, deleted, and replaced with another credential. FIG. 2 depicts an embodiment in which the device is permitted to enroll in exactly one network service.

According to the embodiments of the present invention, the non-volatile apparatus memory is initialized with a copy of the device manufacturer's DTLA certificate. This state is referred to in the state transition diagram 200 as "HAS MANUFACTURER'S CREDENTIAL" 210. A DELETE operation erases credential memory to disable the apparatus. This state is referred to in the state transition diagram 200 as "EMPTY" 230. An ENROLL transaction (as within arc C of FIG. 1) replaces the device-manufacturer's credential in the apparatus with a network-service credential. This state is referred to in the state transition diagram 200 as "HAS NETWORK-SERVICE CREDENTIAL" 220. Subsequent RE-ENROLL transactions (as within arc C of FIG. 1) authenticate using the current network-service credential. Network-service equipment and operators do not necessarily allow every device to automatically ENROLL or RE-ENROLL, which in an embodiment is an infrequent procedure performed by the user when the device is first installed in the residence or office, or at the time of moving to a new or different household or enterprise network. The mobile case is special because source devices may accept local credentials with non-local IP addresses. In an alternative embodiment, the network enrollment is entirely under user control and the device may be enrolled and re-enrolled entirely under user control.

Continuing with reference to FIG. 2, the ENROLL transaction according to embodiments of the present invention is further described. Rather than physical proximity, the present invention uses a logical association between a data-processing device and a network-service device, which issues a signed credential when the particular source or sink device enrolls on its network. A credential typically identifies a particular authority whose signature conveys implicit authorization for some access. The network-service credential identifies the network-service, which includes the name or address of the service provider and optional subscriber information. The name is a large (e.g., 16 byte) and random number in an embodiment, and the address is an IP address.

Network service providers have various means to associate a subscriber with an interface to their network, including the medium access control address of a broadband modem. In one embodiment, an explicit identifier for a network subscriber is defined, which may be referred to as a "subscriber identifier (ID)." The subscriber ID conveys information that the network-service uses to identify a subscriber's home network. According to DHCP standards, the subscriber ID option is stripped off along with physical network information before the network address is passed to a subscriber's device. In one embodiment of the present invention, upon enrollment, the network-service identifier is returned to the device in the form of a network-service credential.

In an embodiment, an authority issues the network-service credential or delegates this role to the network operator or equipment vendor. This authority issues a certificate attesting to one or more things about a device. For multimedia devices, a licensing authority issues a digitally signed credential attesting that the device is authorized to process some class of data. Such licensing authorities exist for DVD, IEEE 1394, Open Mobile Alliance, and digital video devices. The DTLA licenses DTCP devices on IEEE 1394 buses, IP networks, and other communications media.

In one embodiment, the apparatus uses the DTLA, CMLA or some other device licensing authority as a signing authority for network-service credentials. In another embodiment, the apparatus uses the certificate authority of the network service. In yet another embodiment, the apparatus accepts equipment vendors' credentials. In these embodiments, the credential contains the cryptographic identity (e.g., the public key in an X509 certificate) of the device and of the network service provider. The destination (sink) and network-service devices use these identities in authenticated key establishment, such as in a DTCP, Protected Entertainment Rights Management (PERM) or Internet Key Exchange (IKE) procedure. Thus, the apparatus maintains a network-service identity after an enrollment transaction, which serves as a unique string for the network service. In an embodiment, the apparatus is physically attached to a data-processing device on a private network, which becomes logically associated with a network service upon enrollment. The methods for disassociation with the network (de-enrollment) and association with a new network (re-enrollment) can be mandated by security policies and licensing rules that are implemented in compliant devices.

Referring now to FIG. 3, in an embodiment, distinctions such as mobile and household transactions are enumerated as shown in the FIG. 3 truth table 300. In one embodiment, a mobile operation is defined in which a device with a non-local address authenticates with a local credential. The present embodiment, therefore, uses a logical rather than a physical notion of network service for home and enterprise networks that extends to remote devices on the Internet. Furthermore, the subject invention applies to networks that have no connection to the Internet and to those that have multiple Internet Service Provider (ISP) connections (e.g., are "multi-homed"). A home network typically operates among household devices even when Internet connectivity is unavailable, temporarily or permanently.

Continuing with reference to FIG. 3, the truth table 300 can be used to determine what type of device (designated herein as household, mobile, visitor, or foreign devices) is attempting to gain access to a particular DHCP-based network service (e.g., a server of movies or other media). In one embodiment, the truth table 300 resides in the authorization logic of a server or source device on the same network as the sink device. The type of a device attempting to gain access to data on a source device can be determined based on its IP address and network-service credential. If it were a household device attempting to gain access, it would have the same IP address and same network-service credential as the DHCP-based network service device's apparatus. If it were a mobile device, it would have a different IP address and the same network-service credential as the DHCP-based network service device's apparatus. If it were a visitor device, it would have the same IP address and a different network-service credential as the DHCP-based network service device's apparatus. And, if it were a foreign device, it would have a different IP address and a different network-service credential as the DHCP-based network service device's apparatus.

An item of content, for example, can be labeled as being available only to certain types of devices. For example, an item of content identified as being available only to household devices would only be provided to a sink device that is identified as a household device according to truth table 300.

FIG. 4 is a block diagram showing an embodiment of the household network model 400. On household network model 400, each source and sink device (430, 440, and 450) enrolls with the local DHCP server 420, which in turn enrolls with the ISP DHCP server 410 for the ISP's network. The local DHCP server 420 uses its manufacturer's credential for authorizing the network credential it issues, and it uses its manufacturer's DTLA credential in this way until it enrolls with the ISP DHCP server 410, which then issues another network-service credential for the household DHCP service. The presence and identity of the devices on the private network are disclosed only to the local network service and not to the ISP network service, when there is a private network (e.g., when network address translation is used on a home network). In an embodiment that has a local network service on a private network, the device may receive a pair of credentials, one for the local network service and one for the ISP's network service. Thus, a data-processing device on a home network becomes associated with a network service in the form of a unique string for the network service. This is true in embodiments that are independent of DHCP as well as those that co-locate the network service with a DHCP server or relay.

Figure 5:
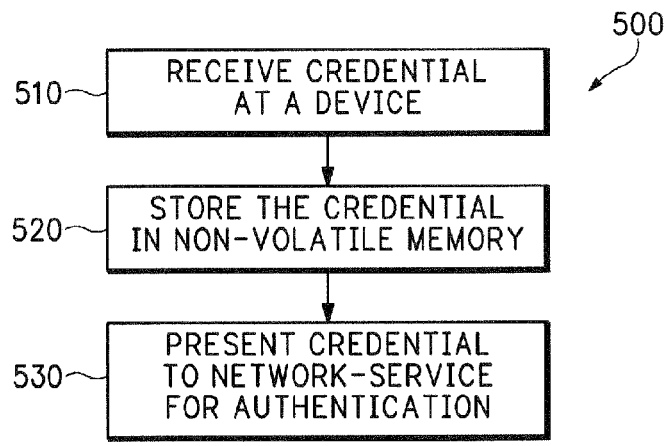
FIG. 5 is a flowchart of a method for credentialing a device according to an embodiment of the present invention.

FIG. 5 is a flowchart of a method 500 for credentialing a device according to an embodiment of the present invention. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed.

In step 510, a credential is received at a device. The credential indicates that the device is enrolled in the network or service.

In step 520, the credential is stored in non-volatile memory on the device. The credential binds the device to the network and thus controls device access to other networks, according to the particular policies of those networks.

In step 530, the device presents the credential to a provider of a service. The provider uses the credential to authenticate the device, wherein upon authentication the authorized device is provided access to the service. Whether the device is authorized is determined by truth table 300 and licensing constraints on the content in an embodiment. If the device has a household IP address and is enrolled on the household network, for example, it may be authorized to access household content whereas a mobile or foreign device may not be so authorized. The presentation of the credential and the authentication process are transparent to a user of the device.

Figure 6:
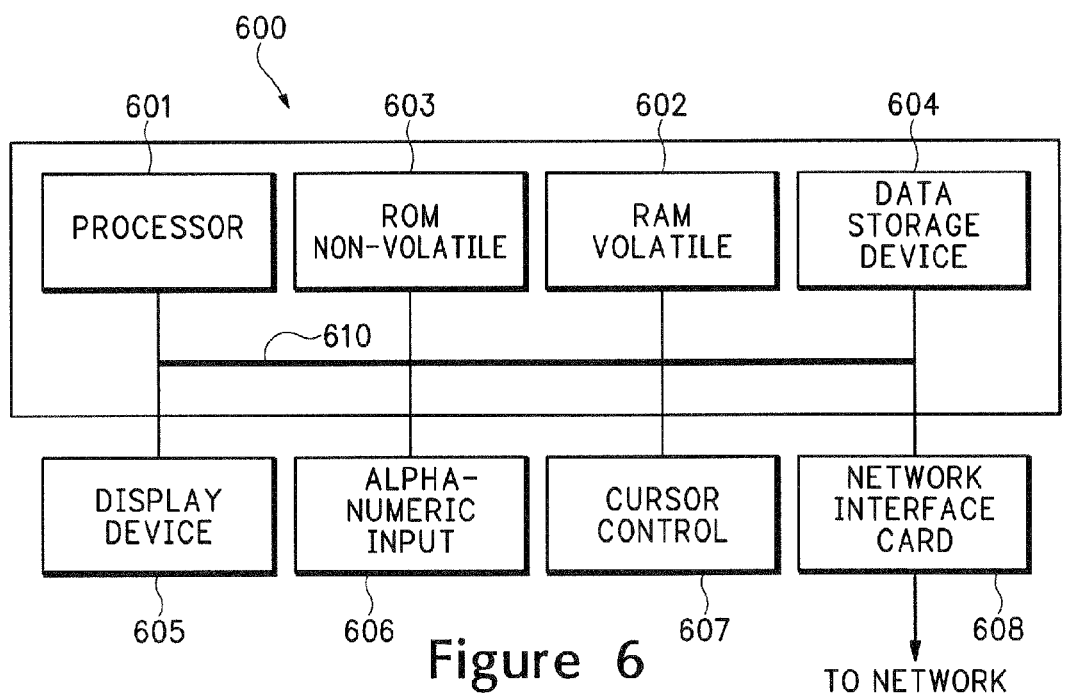
FIG. 6 is a block diagram of a device upon which embodiments of the present invention may be implemented.

FIG. 6 is a block diagram of a device 600 upon which embodiments of the present invention may be implemented. In general, device 600 comprises bus 610 for communicating information, processor 601 coupled with bus 610 for processing information and instructions, random access (volatile) memory 602 coupled with bus 610 for storing information and instructions for processor 601, read-only (non-volatile) memory 603 coupled with bus 610 for storing static information and instructions for processor 601, data storage device 604 such as a magnetic or optical disk and disk drive coupled with bus 610 for storing information and instructions, an optional user output device such as display device 605 coupled to bus 610 for displaying information to the computer user, an optional user input device such as alphanumeric input device 606 including alphanumeric and function keys coupled to bus 610 for communicating information and command selections to processor 601, and an optional user input device such as cursor control device 607 coupled to bus 610 for communicating user input information and command selections to processor 601. Furthermore, a network interface card (NIC) 608 is used to couple device 600 onto, for example, a computer system network.

Display device 605 utilized with device 600 may be a liquid crystal device, cathode ray tube, or other display device suitable for creating graphic images and alphanumeric characters recognizable to the user. Cursor control device 607 allows a user to dynamically signal the two-dimensional movement of a visible symbol (pointer) on a display screen of display device 605.

Embodiments of the present invention thus provide data-dissemination controls on home or enterprise networks to enable and control data transfer on, to, and from these networks. Embodiments of the present invention can be implemented natively, or as "bump-in-the-stack" and "bump-in-the-wire" embodiments. That is, in the latter instances, embodiments of the present invention can be implemented as an addition to existing protocols and standards in a manner transparent to legacy devices.

Embodiments of the present invention are thus described. While the present invention has been described in particular embodiments, it should be appreciated that the present invention should not be construed as limited by such embodiments, but rather construed according to the below claims.

What is claimed is:

1. A method for controlling access to a service over a network, said method comprising:
   receiving a network-service credential at a device, wherein said network-service credential is issued by a provider of said service and includes a value to indicate that said device is enrolled in said network, wherein the value is selected from the group including a name of the service provider and an Internet Protocol (IP) address of the service provider;
   identifying a device-manufacturer credential that is stored in a non-volatile memory of said device and that identifies a manufacturer of said device;
   storing said network-service credential in said non-volatile memory on said device to replace the device-manufacturer credential, wherein the existence of said network-service credential in said non-volatile memory binds said device to said network and prevents said device from accessing other networks besides the network; and
   said device presenting said networkservice credential to the provider of said service, wherein said provider uses said network-service credential to authenticate and authorize said device, wherein upon authorization said device is provided access to said service.

2. The method of claim 1 wherein said network-service credential is a Digital transmission Licence Authority (DTLA) credential.

3. The method of claim 1 wherein said network-service credential comprises a cryptographic identity of said device and of said provider.

4. The method of claim 1 wherein said network comprises a plurality of devices coupled to a local server, said local server couplable via the Internet to a remote server for said provider, wherein said local server enrolls with said remote server and wherein said devices enroll with said local server.

5. The method of claim 1 wherein said device is a multi-homed device having a plurality of public addresses, wherein said device is assigned a network-service credential for each of said addresses.

6. An apparatus, comprising:
   a bus;
   one or more processors coupled to said bus; and
   a memory unit coupled to said bus, said memory unit containing instructions that when executed by the processors are operable to:
   receive a network service credential sent from an issuing device operated by a service provider that controls access to a service, the network service credential logically associating the network service credential with the service provider through inclusion of a name or address of the service provider in the network service credential;
   identify, in a non-volatile memory of said apparatus, a location corresponding to a device-manufacturer credential that identifies a manufacturer of said apparatus;
   store said network service credential in the identified location in the non-volatile memory wherein the existence of said network-service credential in said non-volatile memory binds said apparatus to a network and prevents said apparatus from accessing other networks besides the network; and
   present said network service credential to said service provider for allowing said service provider to authenticate and authorize said apparatus to access the service based on the network service credential.

7. The apparatus of claim 6, wherein said network service credential logically associates the apparatus with the service provider by including an Internet Protocol (IP) address that corresponds to a network associated with the network service credential.

8. The apparatus of claim 6, wherein said network service credential logically associates the apparatus with the service provider by including a sixteen Byte name of the service provider.

9. The apparatus of claim 6, wherein said network service credential logically associates a home network that includes the apparatus with the service provider by including a subscriber identifier that is defined by the service provider and that includes a medium access control address of a broadband modem that provides the apparatus access from the home network to the Internet.

10. The apparatus of claim 6, wherein the apparatus operates in a home network comprising a plurality of network devices coupled to a local gateway, said local gateway couplable via the Internet to a remote server for said provider, wherein said apparatus enrolls with said local gateway which enrolls with said remote server.

11. The apparatus of claim 6, wherein said apparatus is also associated with an Internet Protocol (IP) address, wherein said apparatus IP address is used in combination with said network service credential to determine whether access to said service is permitted.

12. The apparatus of claim 6, wherein the network service credential is stored in a portion of said non-volatile memory that is initially used for storing a manufacturer-device certificate.

13. An apparatus, comprising:
one or more processors; and
a memory unit coupled to said bus, said memory unit containing instructions that when executed by the processors are operable to:
receive a network service credential sent from an issuing device operated by a service provider that controls access to a service, the network service credential logically associating the network service credential with the service provider though inclusion of a name or address of the service provider in the network service credential;
identify a location in a non-volatile memory of the apparatus for storing a device- manufacturer credential that identifies a manufacturer of said apparatus; and
store the received credential in the identified location in the memory to replace the device-manufacturer credential, wherein the existence of said network service credential in said non-volatile memory binds said apparatus to a network and prevents said apparatus from accessing other networks besides the network.

14. The apparatus of claim 13, wherein said network service credential logically associates the apparatus with the service provider by including an Internet Protocol (IP) address that corresponds to a network associated with the network service credential.

15. The apparatus of claim 13, wherein said network service credential logically associates the apparatus with the service provider by including a sixteen Byte name of the service provider.

* * * * *

UNITED STATES PATENT AND TRADEMARK OFFICE
CERTIFICATE OF CORRECTION

PATENT NO. : 7,533,258 B2 Page 1 of 1
APPLICATION NO. : 11/032764
DATED : May 12, 2009
INVENTOR(S) : Baugher It is certified that error appears in the above-identified patent and that said Letters Patent is hereby corrected as shown below:

At column 8, line 14, claim 1 please replace "networkservice" with --network-service--.
At column 8, line 20, claim 2 please replace "transmission" with --Transmission--.

Signed and Sealed this

Seventh Day of July, 2009

JOHN DOLL
*Acting Director of the United States Patent and Trademark Office*